Figure 1:
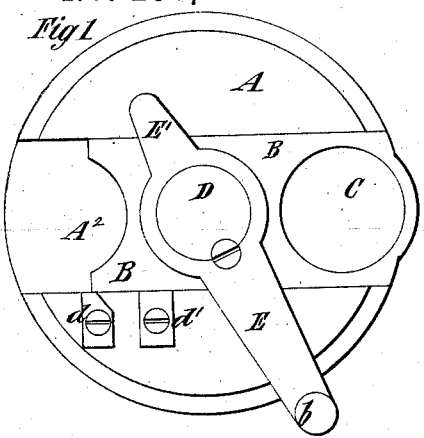

(No Model.) 2 Sheets—Sheet 1.

G. QUICK.
BREECH LOADING ORDNANCE.

No. 258,116. Patented May 16, 1882.

Witnesses:
Fred Hayner
Ed Moran

Inventor:
George Quick (No Model.) 2 Sheets—Sheet 2.

G. QUICK.
BREECH LOADING ORDNANCE.

No. 258,116. Patented May 16, 1882.

Witnesses:
Theo. K. Hayner
Ed Moran

Inventor:
George Quick
by his Attorneys
Brown & Brown

UNITED STATES PATENT OFFICE.

GEORGE QUICK, OF CHIPPING CAMDEN, ENGLAND.

BREECH-LOADING ORDNANCE.

SPECIFICATION forming part of Letters Patent No. 258,116, dated May 16, 1882.

Application filed January 24, 1882. (No model.) Patented in England May 24, 1881, in France June 3, 1881, in Belgium June 4, 1881, and in Germany August 20, 1881.

*To all whom it may concern:*

Be it known that I, GEORGE QUICK, of Chipping Camden, England, have invented certain new and useful Improvements in Breech-Loading Ordnance, of which the following is a specification.

My invention relates to that class of breech-loading ordnance in which the powder-chamber of the gun is closed by means of a breech-screw, which is turned to cause its inner end, or a gas check or ring thereon, to enter and close the powder-chamber.

The principal objects of the invention are to afford greater facility for loading the gun by enabling the breech to be opened by a single crank or lever movement and closed by a similar but reversed movement, and also to provide a more effective gas check or ring for the breech-screw.

To these ends my invention consists in the combination, with a gun having a horizontal open slideway extending transversely to the bore in the extreme breech end thereof, and provided on its upper and lower sides with parallel lands and grooves, of a sliding carriage having corresponding lands and grooves fitted in said slideway, so as to leave considerable space between the carriage and the powder-chamber, and having in it a loading-hole, and a breech-screw fitting in said carriage and adapted to be turned to close the powder-chamber of the gun.

The invention also consists in the combination, with the above, of an arm applied to the screw and a bearing on the breech end of the gun, with which the said arm, or a pin or roller thereon, is adapted to engage after the screw has been operated a portion of a turn to draw it back, and which forms a fulcrum, by which the further movement of the screw is made to impart a bodily movement to the sliding carriage for bringing the loading-hole in the carriage into line with the bore of the gun. In small guns the arm on the screw may constitute the operating lever or crank for turning the screw, or be made in the same piece therewith.

The invention also consists in the combination, with the sliding carriage, the breech-screw fitting therein, and the lever applied to the breech-screw, of a novel arrangement of wheel and pinion for applying greater power for turning the breech-screw and moving the sliding carriage in heavy ordnance.

The invention also consists in the combination, with a breech-screw, of a gas-check ring of novel construction for closing the powder-chamber.

Figure 3:
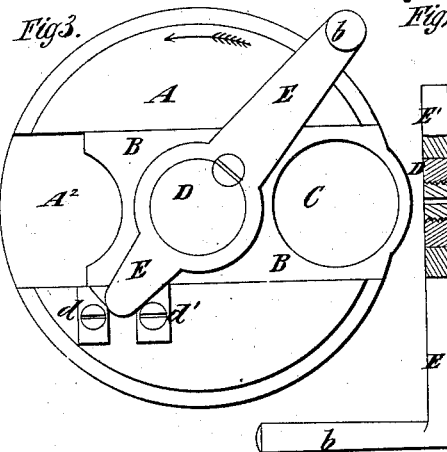
Figure 2:
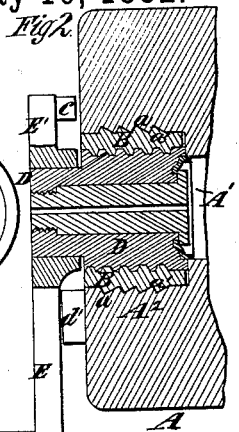
Figure 4:
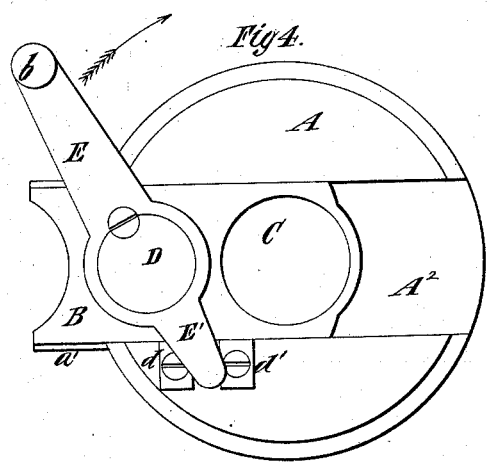
Figure 5:
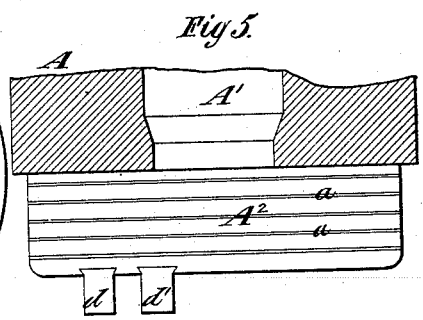
Figure 7:
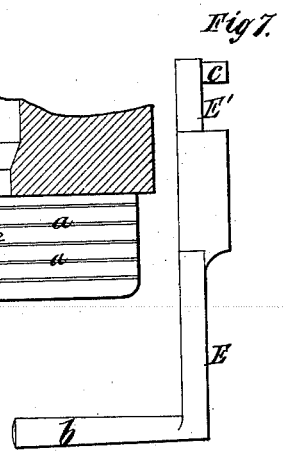
Figures 6, 7:
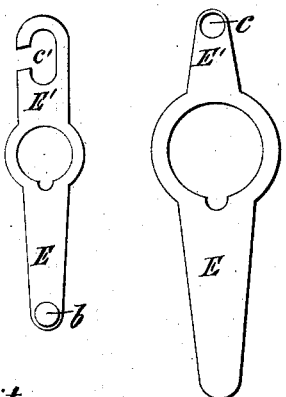
Figure 9:
Figure 8:
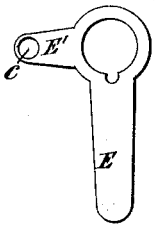
Figure 10:
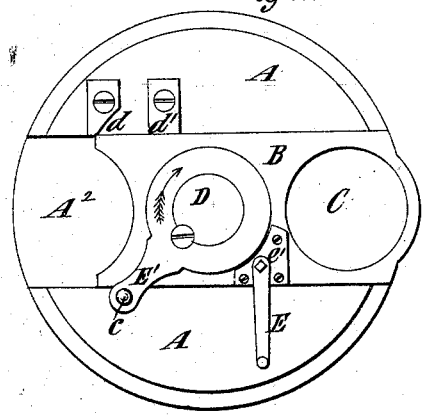
Figure 11:
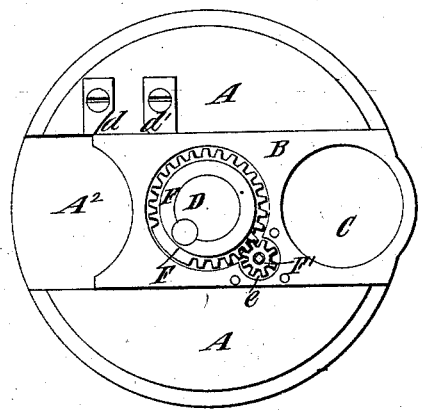
Figure 12:
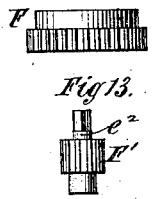
Figure 13:
Figure 14:
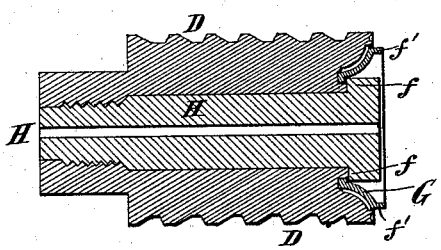
Figure 15:
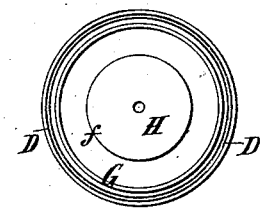
Figure 16:
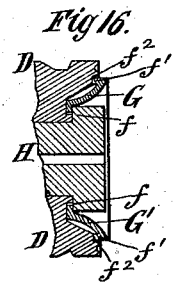
Figure 17:
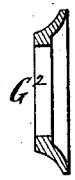
Figure 18:
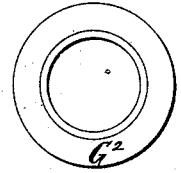
Figure 19:
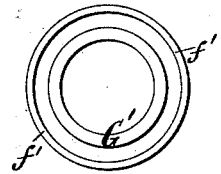

In the accompanying drawings, Figure 1 represents an end view of a gun embodying my invention, showing the breech as closed ready for firing. Fig. 2 represents a longitudinal section of the breech portion of the gun. Fig. 3 represents an end view, showing the position of the operating-lever when the breech-screw and gas check are withdrawn from the powder-chamber. Fig. 4 represents an end view, showing the sliding carriage adjusted for loading. Fig. 5 represents a horizontal section through the powder-chamber and slide-way, the carriage being removed. Figs. 6 and 7 represent respectively face and side views of the operating lever or crank. Fig. 7* represents a face view of an operating-lever of modified form. Figs. 8 and 9 represent face views of two operating levers or cranks of modified form. Fig. 10 represents an end view of a gun, also embodying my invention, in which a gear-wheel and pinion are employed for shifting the carriage, showing the breech closed and ready for firing. Fig. 11 represents a similar view with the cap-plate of the pinion, the operating-handle, and the arm which is carried by the screw and engages with the guide or slot in the gun to move the carriage removed. Figs. 12 and 13 represent edge views of the wheel and pinion employed for shifting the carriage. Fig. 14 represents a longitudinal section of the breech-screw and a gas-check ring. Fig. 15 represents an end view of said screw and ring. Figs. 16 and 17 represent sectional views of gas-check rings of different form, and Figs. 18 and 19 designate respectively front and back views of the rings shown in Figs. 16 and 17.

Similar letters of reference designate corresponding parts in all the figures.

Referring first to Figs. 1 to 9, inclusive, A designates the breech portion of the gun, and A' the powder-chamber thereof. In the extreme end of the breech I form a transverse slideway, A², open at the back, as clearly seen in Figs. 2 and 5. This slideway is approximately horizontal or in line with the trunnions. The slideway may be formed by removing the metal with drilling and slotting machines, and in the upper and lower faces thereof I form with a planing or slotting machine parallel grooves and lands $a$. This slideway extends from side to side of the gun.

B designates a metal block, which is fitted in the sideway A², and constitutes a sliding carriage. It is held against backward movement when the gun is discharged by numerous grooves and lands, $a'$, which engage with the grooves and lands $a$ of the slideway, and has in it two holes, which are of approximately the size of the bore of the gun. The first of the holes, which I designate C, is a loading-hole, and when the carriage B is moved transversely to the bore of the gun in the slideway A², so as to bring the hole C in line with the powder-chamber A', the ammunition may be inserted directly through the sliding carriage. The other hole through the carriage B has a female screw-thread cut in it, and D designates a breech-screw, which is fitted in said screw-threaded hole, and is adapted to be turned to close the powder-chamber when it is brought into line therewith by the sliding of the carriage.

In fitting the carriage B in the slideway A², I prefer to leave a considerable space between the front side or face of the carriage and the adjacent back wall of the slideway in which is the powder-chamber, so that there will be no liability of the carriage being jammed in the slideway by any powder-residuum or fouling arising from any escape of gas from the powder-chamber.

The sliding carriage B may be about three calibers in length. The front end of the breech-screw D is formed so as to enter the rear end of the powder-chamber A', and I fit it with an expanding metal ring and with a valve-face, as hereinafter described; or a Broadwell gas-ring or any other suitable form of gas-check may be employed for preventing the gas from escaping from the powder-chamber when the gun is fired. The outer or rear end of the breech-screw D projects somewhat beyond the rear face of the carriage B; and E designates a lever or crank fitted rigidly to the projecting end of the screw and adapted to serve as a means of operating it. By operating the lever or crank E by the hand the screw may be turned sufficiently to withdraw its inner end from the powder-chamber when it is desired to shift the carriage B, or to cause its inner end to enter and tightly close the powder-chamber when it is desired to fire the gun. The lever or crank E is provided with an outwardly-projecting handle, $b$, whereby it may be turned.

E' designates an arm, which is here represented as projecting from the screw D on the side opposite to that in which the lever or crank E projects, and which may be made in the same piece with said lever or crank, as here shown. Upon the inner side of the arm E' is a projecting pin or roller, $c$, (shown in Figs. 2 and 7,) and in the circular path which is described by said pin or roller, when the screw is turned, are two lugs, $d\ d'$, projecting from the rear of the gun, as shown most clearly in Fig. 5, and forming between them a guideway or bearing, which is adapted to receive the pin or roller $c$. The lug $d$ is inclined somewhat upon the upper portion of the side which is adjacent to the lug $d'$, so that the pin or roller $c$, which moves in a circular path, may the more readily enter between said lugs and then leave them. The position of the lever E and arm E' (shown in Fig. 1) is that which they occupy when the gun is ready for firing. When the breech is opened, after firing the lever is turned in the direction indicated by the arrow, and by the time the pin or roller $c$ on the arm E' reaches the lugs $d\ d'$ the screw D has been withdrawn sufficiently to clear the powder-chamber, and the carriage B is free to move transversely. The continued movement of the lever E causes the pin or roller $c$ to enter the guide between the lugs $d\ d'$ and bear against the lug $d'$, and the latter then serves as a fulcrum upon which the pin or roller $c$ acts, and continued pressure on the lever will cause the carriage to move bodily in the slideway to bring the loading-hole C into line with the bore, as shown in Fig. 4. As the lever E and arm E' approach and pass a vertical position the pin or roller $c$ moves down and then up between the lugs $d\ d'$. After the gun is loaded the lever E is moved in the direction indicated by the arrow in Fig. 4, and the pin or roller $c$ will then bear on the lug $d$ and the carriage be shifted inward until the screw D is in line with the powder-chamber. Just at that time the pin or roller $c$ passes out of contact with the lug $d$, and by turning the lever E still farther back to the position shown in Fig. 1 the breech is entirely closed and the gun made ready for firing.

It will be observed that the arm E' can only move about a quarter of a turn before its roller $c$ begins to act on the lug $d'$, and thus effect the movement of the carriage. If it is desired to allow a greater movement of the screw before the carriage is moved, I may employ a piece like that shown in Fig. 8, in which the lever E and arm E' are at right angles to each other; or the pin or roller $c$ may be placed directly on the inner side of the lever E, as seen in Fig. 9, and the arm E' be dispensed with.

Instead of the arm E' being provided with a pin, $c$, which engages with a bearing formed by the lugs $d\ d'$ on the rear end of the gun, an arm of the form shown in Fig. 7* may be employed. The said arm E has in its end a slot, $c'$, extending from its edge inward, which is adapted to engage with a bearing formed by a pin projecting from the breech of the gun, in lieu of the lugs $d\ d'$.

Referring now to Figs. 10, 11, 12, and 13, A designates the gun, and B the carriage, arranged in the slideway A², as above described. D designates the breech-screw, C the loading-hole, and d d' lugs arranged as before, except that they are above the slideway instead of below it, as before described. In this example of my invention the screw is not turned directly by a lever or crank, but it has a gear-wheel, F, secured upon it; and F' designates a pinion, which is fitted in a recess, e, in the carriage B, and is secured by a cap-plate, e'. The shaft e² of the pinion F' is adapted to turn in bearings in the carriage and cap-plate e'; and E designates a lever or crank applied thereto for turning it. It will be understood that by the use of the wheel F and pinion F' a greater power is obtained for operating the carriage and screw. Upon the screw D is secured an arm, E', having a pin or roller, c, which operates on the lugs d d', as above described with reference to Fig. 1.

In Figs. 14 to 19, inclusive, I have illustrated several modifications of gas-ring checks which I may employ for closing the powder-chamber tightly.

Referring first to Figs. 14 and 15, D designates the breech-screw, which is recessed at the inner end; and G designates a ring of steel or other suitable metal, which is flared, and fits in the recess in the end of the screw D. The ring G is secured in place by a bolt, H, the head of which bears upon a flange, f, on the ring and holds it in place. It will be observed that the outer face of the ring is convex, and that the edge or rim f' of the ring projects slightly beyond the end of the screw D, and is adapted to enter the end of the powder-chamber. It will also be seen that the breech-screw and check-ring are so combined that a small space is left between them opposite the convex front face of the ring. When the screw D is screwed up the inner end abuts against the end of the powder-chamber, and when the gun is fired the pressure, acting upon the convex face of the ring G, flattens the same or presses it down upon the end of the screw; which is permitted by the space left between the screw and ring, and thereby expands the rim or edge f' of the ring, so as to cause it to tightly fill the powder-chamber and fit gas-tight therein.

The ring G' (shown in Figs. 16 and 19) is similar to that just described, except that the rim or edge f' is turned backward and rests in an annular recess, f², in the end of the screw D. The recess f², in the end of the screw in which the rim f' of the ring G' fits, is slightly larger in diameter than the ring, so as to allow it to expand, and when the convex side or face of the ring is pressed in by gas-pressure the ring is expanded in diameter, as before described.

The ring G² (shown in Figs. 17 and 18) is like those before described, excepting that instead of having a cylindric rim, f', like the rings G G', its outer edge is cylindric, and is adapted to fit in the powder-chamber.

By my invention I enable the breech of a gun to be entirely opened by a single movement—that is, by simply turning the lever or crank E—and hence it can be very quickly done. I also provide a very effective gas-ring check for breech-screws generally.

What I claim as my invention, and desire to secure by Letters Patent, is—

1. The combination, with a gun having a horizontal open slideway extending transversely to the bore in the extreme breech of the gun, and provided upon its upper and lower sides with parallel grooves and lands, of a sliding carriage having corresponding lands and grooves fitted in said slideway, so as to leave a considerable space between said carriage and the powder-chamber, and having a loading-hole, and a breech-screw fitting in said carriage and adapted to be turned to close the powder-chamber, substantially as specified.

2. The combination, with the gun having a transverse slideway, the carriage fitting therein, and the breech-screw in said carriage, of an arm fixed upon the screw and a bearing or guide on the gun, with which said arm, or a pin or roller thereon, is adapted to engage to shift the carriage, substantially as specified.

3. The combination, with the gun having a transverse slideway in the breech, the sliding carriage, and the breech-screw fitting therein, of a gear-wheel fixed upon the screw, an arm, also fixed upon the screw and carrying a pin or roller, a pinion and lever or crank for turning said gear-wheel and screw, and a guide or lugs on the breech of the gun, with which said pin or roller may engage to shift the carriage, substantially as specified.

4. The combination, with a flared gas-check ring having a convex face and adapted to be flattened by the pressure of gas upon said convex face to expand it diametrically, of a breech-screw, in which said ring is secured, so as to leave a space between the ring and screw opposite the convex face, whereby provision is afforded for the flattening of the ring, substantially as and for the purpose described.

GEORGE QUICK.

Witnesses:
JOHN H. HOOPER,
*Notary Public, Worcester.*
FRED. WADELY,
*Clerk to Hooper & Hooper, Solicitors, Worcester.*